United States Patent
Xu et al.

(10) Patent No.: US 8,432,063 B2
(45) Date of Patent: Apr. 30, 2013

(54) MULTI-CHANNEL POWER CONTROLLER WITH SWITCHING OFFSET

(75) Inventors: Jian Xu, Windsor (CA); James Allen Buslepp, Livonia, MI (US)

(73) Assignee: Enocean GmbH, Oberhaching (DE)

( * ) Notice: Subject to any disclaimer, the term of this patent is extended or adjusted under 35 U.S.C. 154(b) by 328 days.

(21) Appl. No.: 12/707,686

(22) Filed: Feb. 18, 2010

(65) Prior Publication Data
US 2011/0198926 A1    Aug. 18, 2011

(51) Int. Cl.
*H02J 3/14* (2006.01)
(52) U.S. Cl.
USPC .......................................... 307/38; 323/267
(58) Field of Classification Search ............ 307/38; 323/267
See application file for complete search history.

(56) References Cited

U.S. PATENT DOCUMENTS

| 7,746,675 B2 * | 6/2010 | Wang et al. ............. 363/44 |
| 2008/0239771 A1 | 10/2008 | Wang |
| 2009/0189443 A1 | 7/2009 | Lin |

FOREIGN PATENT DOCUMENTS
WO    2010044017    4/2010

OTHER PUBLICATIONS
International Search Report and Written Opinion dated Sep. 1, 2011.

* cited by examiner

*Primary Examiner* — Hal Kaplan
(74) *Attorney, Agent, or Firm* — Foley & Lardner LLP; Matthew L. Fenselau

(57) ABSTRACT

A method of operating a power controller includes assigning switching offset times to a plurality of channels of a multi-channel power controller, and adjusting a state change time of a selected channel by the switching offset time associated with the selected channel such that the selected channel and another of the plurality of channels multiple channels do not undergo the state change simultaneously.

19 Claims, 2 Drawing Sheets

MULTI-CHANNEL POWER CONTROLLER WITH SWITCHING OFFSET

BACKGROUND

This disclosure relates to power control, and more specifically to a method of operating a multi-channel power controller.

Power controllers are known that include a plurality of channels, each channel being connected to a load. When a channel is turned ON or OFF an EMI spike can be produced. If multiple channels are turned ON or OFF simultaneously the EMI spikes can aggregate, injecting current into system circuitry or increasing the peak EMI emissions from the product.

SUMMARY

A method of operating a power controller includes assigning switching offset times to a plurality of channels of a multi-channel power controller, and adjusting a state change time of a selected channel by the switching offset time associated with the selected channel such that the selected channel and another of the plurality of channels multiple channels do not undergo the state change simultaneously.

A method of operating a multi-channel power controller includes assigning switching offset times to channels of a multi-channel power controller, turning ON a selected channel at a first position in a half-cycle of an AC waveform, and turning OFF the selected one of the plurality of channels after a channel timer reaches a predefined turn OFF time. At least one of the turn ON time of step (B) or the turn OFF time of step (C) is adjusted by the switching offset time of the selected channel.

A multi-channel power controller includes a plurality of power control channels. Each power control channel has a switching offset time such that at least one of a turn ON and a turn OFF time for each of the channels is staggered, and such that each channel is turned ON for an amount of time determined by at least one timer.

These and other features of the present invention can be best understood from the following specification and drawings, the following of which is a brief description.

DETAILED DESCRIPTION

Figure 1:
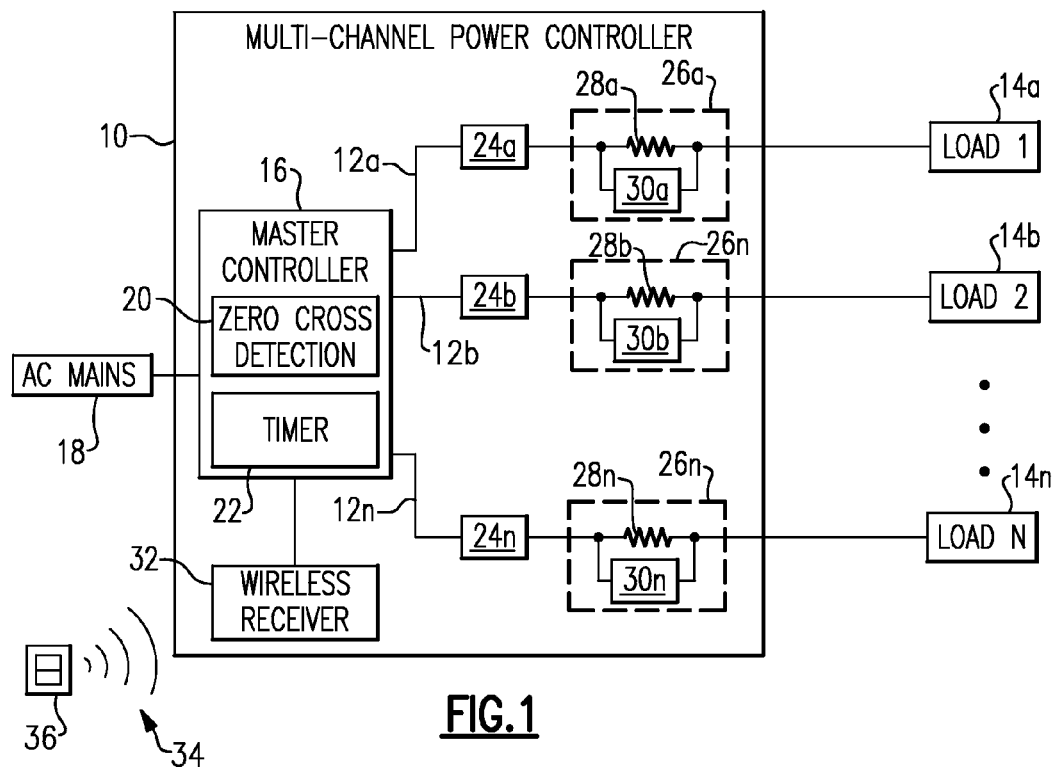
FIG. 1 schematically illustrates a multi-channel power controller operable to implement a switching offset time for each of its power control channels.

FIG. 1 schematically illustrates a multi-channel power controller 10 operable to implement switching offset time for each of its power control channels 12a-n. Each channel 12 is coupled to a load 14a-n. A master controller 16 is operable to selectively control a flow of AC current from AC mains 18 to each of the loads 14a-n. The master controller 16 includes at least one zero cross detection circuit 20 and at least one timer 22. The zero cross detection circuit 20 is operable to detect zero crossings in AC waveforms from the AC mains 18.

Each channel has a slave controller 24 and a fault detection circuit 26. Each fault detection circuit 26 includes a current sensing resistor 28 and a current threshold comparison circuit 30. A voltage across current sensing resistor 28 is proportional to an output current flowing to each load 14. Comparison circuit 30 compares this output current to a threshold, and turns OFF the channel 12 in response to the output current exceeding the threshold. Each slave controller 24 is in communication with its fault detection circuit 26, and is operable to implement commands received from the master controller 16.

The multi-channel power controller 10 further includes a wireless receiver 32 that is operable to receive wireless control signals 34 to turn one or more of the channels 12 ON or OFF, or to dim one or more of the channels 12. In one example, the wireless signals 34 are received from a switch 36. In one example the switch 36 is a self-energizing switch that is batteryless and is operable to harvest mechanical energy from a switch actuation to transmit the wireless signals 34. Of course, wired signals, and switches that are not self-energizing could also be used.

If multiple channels 12 are turned ON or OFF simultaneously, EMI from the channels 12 can aggregate, injecting current into one or more an adjacent channels, potentially tripping one of the fault detection circuits 26. To minimize the effect of EMI, the master controller 16 implements a switching offset time for each of the channels 12, as will be described in reference to FIGS. 2-4 below.

Figure 2:
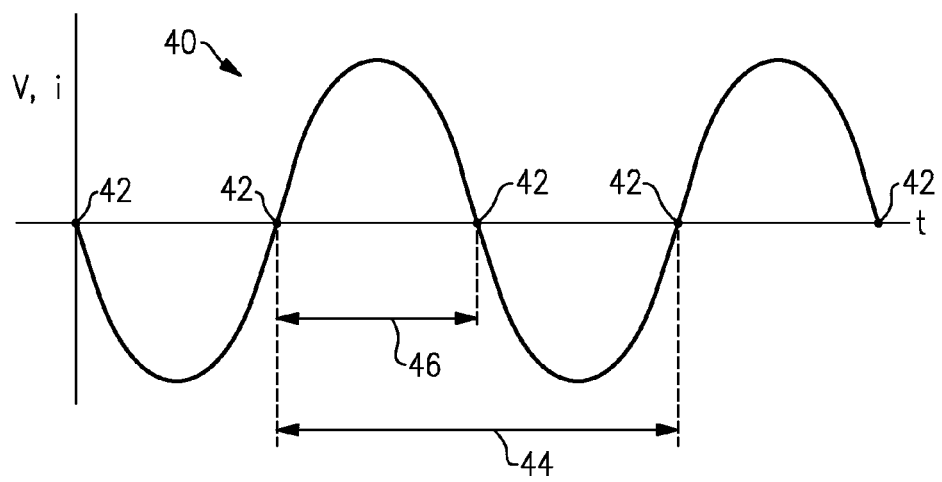
FIG. 2 schematically illustrates an example AC waveform.

FIG. 2 schematically illustrates an example AC waveform 40 that has a plurality of zero crossings 42 and a period 44. The duration of each half cycle is shown as time 46, which is half of the period 44.

Figure 3:
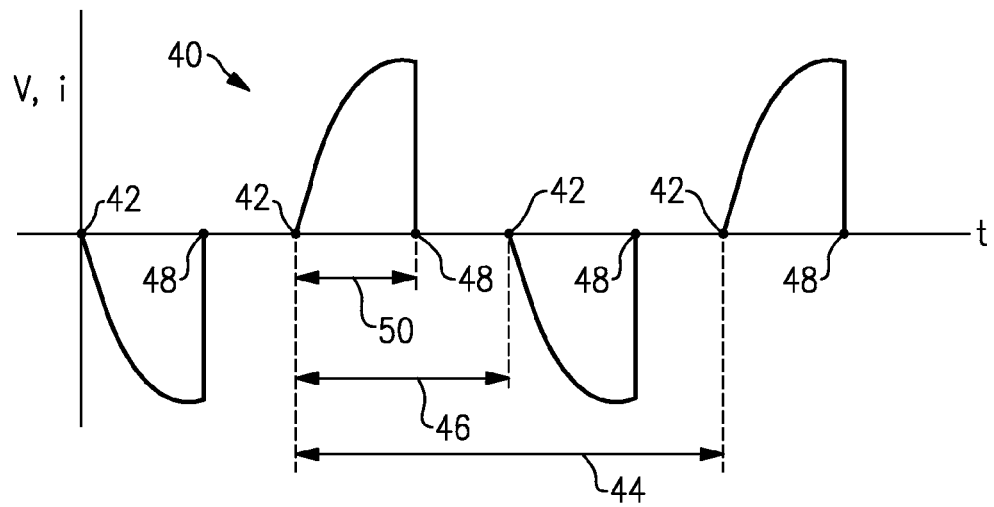
FIG. 3 schematically illustrates reverse-phase control dimming applied to the AC waveform.

FIG. 3 schematically illustrates reverse-phase control dimming applied to the AC waveform 40, which may be used to achieve dimming if one or more of the loads 14 was a lighting source. In reverse-phase control, a channel 12 is turned ON at a zero crossing 42, when voltage is equal to zero, but are turned OFF at a higher non-zero voltage 48 at time 50 such that a ratio of time 50 to time 46 corresponds to an amount of dimming.

Figure 4:
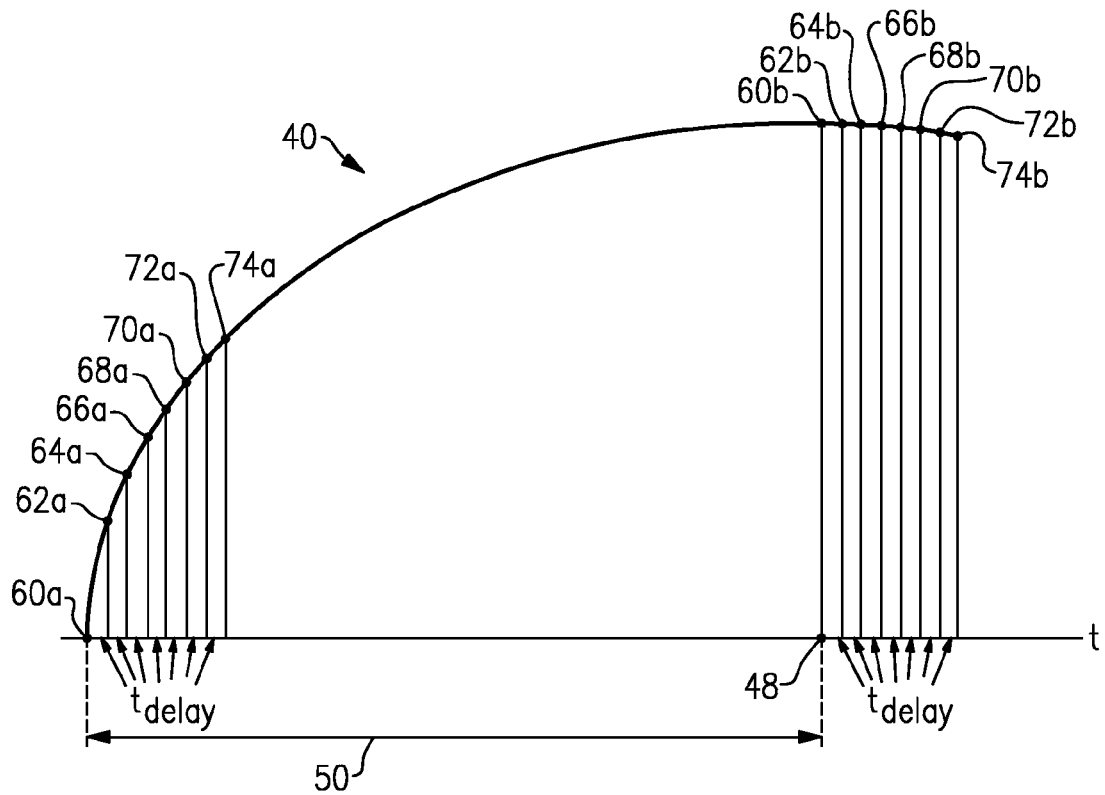
FIG. 4 schematically illustrates reverse-phase control dimming of the AC waveform with a switching time offset.

FIG. 4 schematically illustrates reverse-phase control dimming with a switching offset time for the multi-channel channel power controller 10, in which a turn ON and a turn OFF time for each of the plurality of channels 12 are offset by implementing a switching delay time. However, as will be described below, a switching advance time would also be possible. At least one of the master controller 16 or one of the slave controllers 24 assigns a switching delay to each of the channels 12.

The switching offset time may be determined using equation #1 below.

$$t_{offset} = (N-1) * \Delta t_{min\_offset} \qquad \text{equation \#1}$$

where N is a channel number;

$\Delta t_{min\_offset}$ is a minimum switching offset time; and $t_{offset}$ is a switching offset time for a selected channel.

As shown in equation #1, each switching offset time $t_{offset}$ may be a multiple of the minimum offset time $\Delta t_{min\_offset}$. In one example, the minimum offset time $\Delta t_{min\_offset}$ is within the range of 4 μs-8 μs. Of course, other minimum offsets could be used. The minimum offset time $\Delta t_{min\_offset}$ is selected such that $\Delta t_{min\_offset}$ is short enough to prevent a viewer from detecting the offset. That is, the offset is not perceptible to a human, such that if all eight channels are turned ON or OFF at their staggered times a human would not detect the implementation of the offset. The minimum offset time $\Delta t_{min\_offset}$ also selected to be long enough so that an EMI spikes from multiple channels turning ON or OFF do not aggregate to trip a fault detection circuit 26 for one of the plurality of channels 12 or increase radiated or conducted EMI to unacceptable levels.

In the example of FIG. 4, it is assumed that there are eight channels 12*a-h* in the power controller 10. Of course, this is only an example, and other quantities of channels could be used.

As shown in FIG. 4, channel 12*a* (first channel) is turned ON at time 60*a*, which has an offset time of zero ($t_{offset}$=(1-1)*$\Delta t_{min\_offset}$=0). Time 60*a* also corresponds to a zero crossing 42. Channel 12*a* is turned OFF at time 60*b*, corresponding to voltage 48, resulting in a total ON time of 50 for the half-cycle.

Channel 12*b* (second channel) is turned ON at time 62*a*, which has an offset time of ($t_{offset}$=(2-1)*$\Delta t_{min\_offset}$). Channel 12*b* is turned OFF at time 62*b*, which still results in a total ON time of 50 for the half-cycle.

Channel 12*c* (third channel) is turned ON at time 64*a*, which has an offset time ($t_{offset}$=(3-1)*$\Delta t_{min\_offset}$). Channel 12*b* is turned OFF at time 64*b*, which still results in a total ON time of 50 for the half-cycle.

Channels 12*d-h* are turned ON and OFF at times 66*a-b*, 68*a-b*, 70*a-b*, 72*a-b* and 74*a-b* respectively, such that each channel 12*d-h* still has a total ON time of 50 for the half-cycle.

A turn OFF time for each of the eight channels 12*a-h* may be determined by the timer 22 in the master controller 16, or may be determined by a timer in the slave controllers 34, for example. FIG. 4 illustrates each channel 12*a-h* turning ON and turning OFF in the same order, however it is understood that this would not be required and that other configurations would be possible. For example, channel 12 could be the first channel to turn ON and could be the last channel to turn OFF.

Although a switching delay time has been described, it is understood that the offset could correspond to a switching advance time such that a switching time is advanced instead of delayed. For example, the offset time could be subtracted from a predicted future occurrence of an AC zero crossing such that the switching is performed in advance of the AC zero crossing instead of being performed after the AC zero crossing.

Although an eight channel power controller has been discussed, it is understood that other quantities of channels could be used. Also, it is understood that reverse-phase control is only an example method of controlling a load, and that other methods, such as forward-phase control could be used. Additionally, although AC waveforms have been discussed, the offset switching described above could be useful in other pulse-width modulated power control schemes such as DC lighting control.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of operating a power controller, comprising:
    assigning switching offset times to a plurality of channels of a multi-channel power controller; and
    adjusting a state change time of a selected channel by the switching offset time associated with the selected channel such that the selected channel and another of the plurality of channels do not undergo the state change simultaneously;
    wherein said adjusting a state change time of a selected channel by the switching offset time associated with the selected channel includes:
    detecting a time of occurrence of an AC waveform condition; and
    commanding at least one of the channels to repeatedly turn ON and OFF at a specified time to produce a dimming effect on a lighting source load, the specified time corresponding to the time of the detected AC waveform condition plus or minus the assigned switching offset time for the selected channel.

2. The method of claim 1, wherein the state change includes turning ON, turning OFF, or both turning ON and turning OFF, and wherein said adjusting a state change time of a selected channel by the switching offset time associated with the selected channel includes delaying the state change time or advancing the state change time.

3. The method of claim 2, wherein a different offset time is assigned to each channel.

4. The method of claim 1, wherein each assigned switching offset time differs by at least a minimum offset.

5. The method of claim 4, wherein the minimum offset is within the range of 4 μs -8 μs.

6. The method of claim 1, further comprising:
    selecting a range of integer numbers, a highest number in the range corresponding to the quantity of channels; and
    assigning a number to each of the plurality of channels in the multi-channel controller, wherein the switching offset time for a given channel is determined by subtracting "1" from the channel number, and multiplying the resulting value by the minimum offset.

7. The method of claim 1, wherein the AC waveform condition is a zero crossing.

8. A method of operating a multi-channel power controller, comprising:
    A) assigning switching offset times to channels of a multi-channel power controller;
    B) turning ON a selected channel at a first position in a half-cycle of an AC waveform;
    C) turning OFF the selected one of the plurality of channels after a channel timer reaches a predefined turn OFF time; and
    D) adjusting at least one of the turn ON time of step (B) or the turn OFF time of step (C) by the assigned switching offset time of the selected channel from step (A).

9. The method of claim 8, wherein in step (A) each channel of a plurality of channels of a multi-channel power controller is assigned a different switching delay time, the method further including:
    E) selectively repeating steps (B)-(D) for a selection of the plurality of channels, such that at least one of the turn ON and turn OFF time for each selected channel is staggered.

10. The method of claim 8, wherein said adjusting includes one of delaying or advancing the turn ON time of step (B) or the turn OFF time of step (C) by the assigned the switching offset time of the selected channel from step (A).

11. The method of claim 8, wherein the position in a half-cycle of an AC waveform corresponds to a zero crossing, and wherein the predefined turn OFF time is less than a time of a half cycle of the AC waveform.

12. The method of claim 11, wherein the selected one of the plurality of channels is coupled to a lighting source load, and wherein the ratio of the predefined turn OFF time to the time of the AC half cycle is proportional to an amount of dimming achieved for the lighting source loads in steps (B)-(D).

13. The method of claim 8, wherein steps (B)-(D) are performed in response to a wireless control signal received from a self-energizing switch.

14. A multi-channel power controller, comprising:
a plurality of power control channels, each power control channel having a switching offset time such that at least one of a turn ON and a turn OFF time for each of the channels is staggered, and such that each channel is turned ON for an amount of time determined by at least one timer.

15. The power controller of claim 14, including:
at least one controller operable to assign at least one of the switching offset times and operable to turn ON a selected power control channel at a first position in a half-cycle of an AC waveform, and operable to turn OFF the selected power control channel at a second position in the half-cycle of the AC waveform to achieve a dimming effect.

16. The power controller of claim 14, the at least one controller being operable to detect an AC waveform condition such that the turn ON time of a selected power control channel corresponds to a time of the detected AC waveform condition plus or minus an assigned switching offset time for the selected channel, and wherein a turn OFF time of the selected power control channel corresponds to a predefined turn OFF time of the timer.

17. The power controller of claim 14, including:
a plurality of loads, each load being connected to one of the plurality of power control channels;
a receiver operable to receive wireless control signals, the control module being operable to turn the plurality of loads ON or OFF in response to the wireless control signals.

18. The power controller of claim 14, each power control channel having an associated fault detection module, each fault detection module being operable to turn OFF its associated channel in response to a current in the associated channel exceeding a current threshold.

19. A method of operating a power controller, comprising:
assigning switching offset times to a plurality of channels of a multi-channel power controller;
adjusting a state change time of a selected channel by the switching offset time associated with the selected channel such that the selected channel and another of the plurality of channels do not undergo the state change;
simultaneously selecting a range of integer numbers, a highest number in the range corresponding to the quantity of channels; and
assigning a number to each of the plurality of channels in the multi-channel controller, wherein the switching offset time for a given channel is determined by subtracting "1" from the channel number, and multiplying the resulting value by the minimum offset.

\* \* \* \* \*